United States Patent [19]

Colas et al.

[11] Patent Number: 4,912,188
[45] Date of Patent: Mar. 27, 1990

[54] CURABLE ORGANOPOLYSILOXANE COMPOSITIONS

[75] Inventors: André R. L. Colas, Glashutten, Fed. Rep. of Germany; Patrick Leempoel, Brussels, Belgium

[73] Assignee: Dow Corning S.A., Seneffe, Belgium

[21] Appl. No.: 229,404

[22] Filed: Aug. 8, 1988

[30] Foreign Application Priority Data

Aug. 15, 1987 [GB] United Kingdom ............... 8719376

[51] Int. Cl.$^4$ ............................................. C08G 77/06
[52] U.S. Cl. ........................................ 528/15; 528/31; 528/32; 525/476; 525/478
[58] Field of Search ................... 525/476, 478; 528/15, 528/31, 32; 524/862

[56] References Cited

U.S. PATENT DOCUMENTS

| | | | |
|---|---|---|---|
| 4,082,726 | 4/1978 | Minc et al. | 528/32 |
| 4,087,585 | 5/1978 | Schulz | 525/477 |
| 4,122,127 | 10/1978 | Mikami et al. | 528/32 |
| 4,311,739 | 1/1982 | Hartman et al. | 528/32 |
| 4,313,988 | 2/1982 | Koshar et al. | 428/40 |
| 4,721,764 | 1/1988 | Fujiki et al. | 528/15 |
| 4,732,932 | 3/1988 | Waldern | 524/862 |

FOREIGN PATENT DOCUMENTS 1561763  3/1980  United Kingdom .

OTHER PUBLICATIONS

Hackh's Chemical Dictionary, McGraw-Hill Book Company New York, p. 317.

*Primary Examiner*—John C. Bleutge
*Assistant Examiner*—Ralph H. Dean, Jr.
*Attorney, Agent, or Firm*—Robert Spector

[57] ABSTRACT

Organopolysiloxane compositions which are curable to elastomers via an addition reaction of unsaturated bonds to silicon-bonded hydrogen atoms in the presence of a group VIII metal catalyst have improved adhesion, without inhibiting their curing, by incorporating an organosilicon compound of the general formula

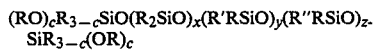

$$(RO)_c R_{3-c} SiO(R_2SiO)_x(R'RSiO)_y(R''RSiO)_z\text{-}SiR_{3-c}(OR)_c$$

wherein R is a hydrocarbon, R' has olefinic unsaturation and at least 6 carbon atoms, R" contains an epoxy group and x, y and z are at least 1, z being 2 if c is 0.

9 Claims, No Drawings

CURABLE ORGANOPOLYSILOXANE COMPOSITIONS

This invention relates to curable organopolysiloxane compositions.

Organopolysiloxane compositions which are curable to elastomers are well known in the art. One type of elastomer-forming composition comprises an organopolysiloxane containing olefinically unsaturated organic groups and an organosilicon compound containing silicon-bonded hydrogen atoms, curable in the presence of a catalyst which comprises a group VIII metal or a compound or complex thereof. Usually, the catalyst is a compound or complex of platinum although other metals, e.g. rhodium and palladium, are operative.

The adhesion of this type of elastomer-forming organopolysiloxane composition to a number of substrates is generally poor and several proposals have been made with a view to achieving improved adhesion. For example it has been proposed to apply a primer to the substrate prior to application of the organopolysiloxane composition. This procedure, however, is not very attractive because two separate operations are required and usually the primer should be allowed to dry before the organopolysiloxane composition is applied. It has also been proposed to incorporate an adhesion promoter into the organopolysiloxane composition prior to application of the organopolysiloxane composition to the substrate.

G.B. Patent Specification No. 1 561 763 for example describes and claims a curable organopolysiloxane composition comprising a mixture of (A) a selected organopolysiloxane containing at least two alkenyl groups, (B) a selected organopolysiloxane containing at least two hydrogen atoms bonded to silicon atoms, (C) a catalyst, and (D) an organosilicon compound having at least one Q(R"O)$_2$Si- group and at least one C$_1$-C$_6$ alkenyl group (which is preferably a vinyl group) or at least one hydrogen atom bonded to silicon atoms which are in the same molecule wherein Q is a monovalent hydrocarbon, halogenated hydrocarbon, or ether oxygen or hydroxyl containing hydrocarbon containing hydrocarbon radical containing at least one epoxy group and R" is a substituted or unsubstituted monovalent hydrocarbon radical. The said Patent Specification states that the cured composition adheres well to many substrates. In compositions according to said Patent Specification, however, the presence of the exemplified organosilicon compound (D) tends to inhibit the cure of the organopolysiloxane compositions. The organosilicon compound (D), which includes the silicon-bonded hydrocarbonoxy groups R"O in addition to epoxy groups and hydrogen atoms or alkenyl groups, is the key component of compositions according to said Patent Specification.

It is an object of the present invention to provide a curable organopolysiloxane composition, comprising a polyorganosiloxane containing olefinically unsaturated organic substituents and an organosilicon compound containing silicon-bonded hydrogen atoms, which has a desirable combination of adhesion characteristics and cure characteristics.

We have now found that a desirable combination of properties may be achieved by incorporating in the curable composition certain organosilicon compounds as adhesion promoter.

According to the present invention there is provided an organopolysiloxane composition comprising, (A) a polyorganosiloxane having per molecule on average at least two units of the general formula $$Q_aQ'SiO_{\frac{3-a}{2}}$$

any remaining units having the general formula $$Q_bSiO_{\frac{4-b}{2}}$$

wherein Q denotes a monovalent hydrocarbon or substituted hydrocarbon group having no more than 8 carbon atoms, Q' denotes an organic group having olefinic unsaturation, a has a value of 1 or 2 and b has a value of 0, 1, 2 or 3 and at least 80% of the Q groups are methyl groups, (B) an organohydrogen siloxane having an average at least two silicon-bonded hydrogen atoms per molecule, any remaining substituent of the silicon atoms being monovalent hydrocarbon groups having no more than 8 carbon atoms, at least 50% of said remaining substituents being methyl groups, (C) a group VIII metal or compound or complex thereof in an amount sufficient to catalyse reaction between (A) and (B), and (D) an organosilicon compound of the general formula $$(RO)_cR_{3-c}SiO(R_2SiO)_x(R'RSiO)_y(R''RSiO)_z\text{-}SiR_{3-c}(OR)_c$$

wherein R denotes a monovalent hydrocarbon or substituted hydrocarbon radical having no more than 8 carbon atoms and which may contain ether oxygen atoms, R' denotes a hydrocarbon group having olefinic unsaturation and having at least 6 carbon atoms, R" denotes a monovalent hydrocarbon or hydrocarbonoxy group or a halogenated hydrocarbon or hydrocarbonoxy group or a hydrocarbon or hydrocarbonoxy group which contains oxygen in the form of an ether linkage or a hydroxyl group, said R" containing an epoxy group, c has a value of 0, 1, 2 or 3, x, y and z have a value of at least 1, with z being at least 2 if c is 0.

The polyorganosiloxanes (A) may vary from freely flowing liquids to highly viscous substances, those having a viscosity in the range from 200 to 5×10$^4$ mm$^2$/s at 25° C. being preferred. They are well known in the art and may be homo polymers, copolymers or mixtures thereof, which comprise units of the general formula $$Q_aQ'SiO_{\frac{3-a}{2}} \text{ and } Q_bSiO_{\frac{4-b}{2}},$$

as aforesaid.

Polyorganosiloxanes (A) may be prepared by well-established techniques, for example by the equilibration of the appropriate cyclic siloxane with an organodisiloxane. Up to 1 percent of the total silicon atoms in the polyorganosiloxane may have silicon-bonded organic groups having olefinic unsaturation provided at least two such organic groups are present per molecule. Not more than one such organic group should be attached to any silicon atom. Such organic groups may be on terminal silicon atoms or pendant from silicon atoms in the polyorganosiloxane chain. Preferably the organic groups having olefinic unsaturation are vinyl groups. At least 80 percent of the remaining substituents in the polyorganosiloxane are methyl groups, any other substituents may be for example other alkyl groups, phenyl groups or 3,3,3-trifluoropropyl groups. Preferably, the proportion of any phenyl groups present should not exceed about 10% of the total number of organic substituents in the polyorganosiloxane. The polyorganosiloxane (A) may have triorganosiloxy end-blocking groups which may be, for example, trimethylsiloxy, dimethylvinylsiloxy, dimethylphenylsiloxy or methylphenylvinylsiloxy. The preferred polyorganosiloxanes (A) are those having on average two vinyl groups per molecule, each of the said vinyl groups being present in an end-blocking triorganosiloxy group, that is being attached to a terminal silicon atom. Examples of the preferred polyorganosiloxanes (A) are methylphenylvinylsiloxy-terminated polydimethylsiloxanes, dimethylvinylsiloxy-terminated polydimethylsiloxanes and dimethylvinylsiloxy-terminated copolymers of dimethyl siloxane and methylphenylsiloxane units.

The organohydrogen siloxanes (B) are also well-known in the art. The silicon-bonded hydrocarbon substituents are preferably selected from alkyl groups having from 1 to 6 carbon atoms and phenyl groups. The organohydrogen siloxanes can be homopolymers, copolymers or mixtures thereof which comprise units such as $M_2SiO$, $M_3SiO_{\frac{1}{2}}$, MHSiO, $HSiO_{3/2}$, $MSiO_{3/2}$, $M_2HSiO_{\frac{1}{2}}$ and $SiO_2$ wherein M is as defined above for Q but preferably represents a $C_1$–$C_8$ alkyl or phenyl group and most preferably methyl. Specific examples of organohydrogen siloxanes (B) are copolymers of trimethylsiloxane units and methylhydrogensiloxane units, copolymers of trimethylsiloxane, dimethylsiloxane and methylhydrogensiloxane units, cyclic methylhydrogensiloxanes and copolymers of dimethylhydrogensiloxane units, dimethylsiloxane units and methylhydrogensiloxane units. The organohydrogen siloxanes preferably have at least 5 silicon-bonded hydrogen atoms per molecule and are most preferably copolymers of trimethylsiloxane units, methylhydrogensiloxane units and, optionally, dimethylsiloxane units having a viscosity of from about 15 to about 500 mm²/s 25° C.

The proportion of organohydrogen siloxane (B) employed is preferably sufficient to provide at least 0.5 and up to 3 silicon-bonded hydrogen atoms per vinyl group in (A).

Component (C) of the compositions of this invention is a group VIII metal or a complex or compound thereof. Preferably component (C) is a platinum compound or complex. This component is effective in catalysing the reaction between the vinyl groups in (A) and the silicon-bonded hydrogen atoms in (B). The addition reaction between SiH groups and unsaturated aliphatic groups is well known in the art of organosilicon chemistry as are a variety of platinum-based catalysts for the reaction. Such catalysts are well documented in the art and include chloroplatinic acid, platinum acetylacetonate, complexes of platinous halides with unsaturated compounds such as ethylene, propylene, organovinylsiloxanes and styrene, hexamethyldiplatinum, $PtCl_2.PtCl_3$ and $Pt(CN)_3$. The preferred platinum catalysts are complexes of platinum compounds and vinyl siloxanes e.g. those formed by the reaction of chloroplatinic acid and divinyltetramethyl disiloxane. Sufficient of the catalyst should be employed to provide a homogeneous and effective cure of the composition. The preferred proportion of platinum catalyst is usually that which will provide for about 1 to about 40 parts by weight of Pt per million parts by weight of (A) and (B) combined.

Compositions comprising (A), (B) and (C) are well known in the art and are described in e.g. British Patent Specifications No. 1 090 122, 1 141 868 and 1 409 223.

As component (D) there is employed an organosilicon compound of the general formula

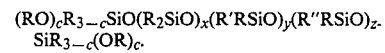

R is a monovalent hydrocarbon or substituted hydrocarbon radical having no more than 8 carbon atoms and which may contain ether oxygen atoms. R is preferably an alkyl, alkoxyalkyl or aryl group. Most preferably R is methyl or methoxyethyl. R' is a hydrocarbon group having terminal aliphatic unsaturation and having at least 6 carbon atoms. R' denotes preferably a higher alkenyl group for example hexenyl, octenyl, decenyl or octadecenyl, but may also denote a higher alkynyl group for example hexynyl and dodecynyl. R'' is a monovalent hydrocarbon or hydrocarbonoxy group or a halogenated hydrocarbon or hydrocarbonoxy group or a hydrocarbon or hydrocarbonoxy group which contains oxygen in the form of an ether linkage or a hydroxyl group, said R'' containing an epoxy group. R'' may for example have the general formula

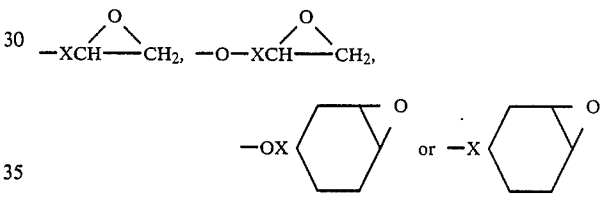

where X is a divalent hydrocarbon group, halogenated hydrocarbon group or ether oxygen or hydroxyl containing hydrocarbon group. Examples of X include methylene, ethylene, propylene, phenylene, chloroethylene, $$-CH_2-O-(CH_2)_2-O-(CH_2)_3-\text{ and } -CH_2CHCH_2-.$$
$$\qquad\qquad\qquad\qquad\qquad\qquad\qquad\qquad\quad |$$
$$\qquad\qquad\qquad\qquad\qquad\qquad\qquad\qquad\;\, OH$$

Preferably R'' has the formula

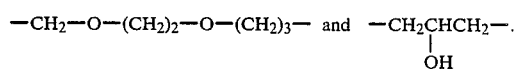

and most preferably X is alkylene or alkyleneoxyalkylene, for example $-(CH_2)_3-OCH_2-$, $-(CH_2)_4-$ or $-CH_2-$, c has a value of 0 to 3, but is preferably 3, x, y and z have a value of at least 1, with z being at least 2 if c is 0. Preferably z is similar to or larger than y, and most preferably z is larger than y. In the preferred organosilicon compounds (D), the sum of x, y and z is less than 20. The organosilicon compound (D) can be prepared by known techniques, for example an organosiloxane polymer having silicon-bonded hydrogen atoms can be reacted with an unsaturated epoxide in the presence of a Pt catalyst, followed by a further reaction with an excess of a diene, a diyne or an ene-yne having at least 6 carbon atoms in the presence of the same catalyst, in order to provide both epoxy functional and alkenyl functional substituents on the organosiloxane, leaving no silicon-bonded hydrogen atoms. From 0.5 to 5% by weight of the the organosilicon compound (D) based on the total composition may be used in the organopolysiloxane composition of the invention. Preferably from 0.5 to 2% by weight is used.

Curable organopolysiloxane compositions according to this invention may also comprise other ingredients, for example fillers, flame retardant additives, heat stabilising additives, pigments and solvents. For example suitable fillers include reinforcing silica fillers such as pyrogenically produced silica and precipitated silica, resinous materials, for example those comprising units of the formula $R_3SiO_{\frac{1}{2}}$ and units of the formula $SiO_2$, alumina, finely divided quartz, calcium carbonate, zinc oxide, titania and zirconium silicate. Fillers which are added to the compositions of this invention are preferably treated with filler treating agents to improve their compatibility with the other components of the composition. Such agents are generally known in the art and include for example hexamethyldisilazane, alkylalkoxysilanes and methylhalogenosilanes. The filler may constitute up to about 50 percent of the total composition, but preferably constitutes from 5 to 40 percent by weight of the composition. The preferred filler is a reinforcing silica filler.

Curable organopolysiloxane compositions according to the invention show improved adhesion to various substrates, for example glass, metals and several plastic substrates without inhibiting the cure of the composition. It was also surprisingly found that the presence of hydrocarbonoxy groups on the organosilicon compounds (D), is not essential to ensure these compounds (D) are effective as adhesion promoters.

The curable organopolysiloxane compositions of this invention are useful as heat curing adhesives for example in the electronics industry and in engineering, e.g. for structural bonding. They are also useful as self priming encapsulants e.g. for electronics. They can be supplied as two pack systems where the polyorganosiloxane (A) together with catalyst (C) may be packed in one part and the organohydrogen siloxane (B) in the other part possibly mixed with part of polyorganosiloxane (A). The component (D) may be added to either or both parts. Alternatively the organopolysiloxane compositions of the invention may be packaged in a single container. In this case it is necessary to incorporate a cure inhibitor or a cure decelerator into the composition in order to avoid premature curing of the composition. Such packaging techniques are known in the art.

The following examples in which the parts and percentages are expressed by weight and the symbol Me represents the methyl group, are given so that the invention may be better understood.

A first base composition was prepared using 513 parts of a polydimethylsiloxane having about 1.2% by weight vinyl groups bonded to silicon atoms, 171 parts of a vinylated resin comprising trimethylsiloxy units and $SiO_2$ units, 30 parts of a methyl hydrogen siloxane having about 0.7% by weight H atoms, 370 parts of a ground quartz filler and 1.2 part of a Pt complex as catalyst. This composition was divided into a number of Lots A to G.

A series of organosilicon compounds was prepared for evaluation as adhesion promoters as follows:

Promoter (P1) was a known adhesion promoter obtained by reacting glycidoxypropyl trimethoxy silane with a hydroxy terminated polymethylvinylsiloxane.

Promoters (P2) to (P5) were prepared by reacting one mole of an organohydrogensiloxane of the formula $$Me_3SiO(Me_2SiO)_x(MeHSiO)_{y+z}SiMe_3$$

with z moles of allylglycidyl ether, except in the case of (P4) where 5, 6 epoxy hexene was used in the presence of a platinum containing catalyst, followed by reaction of the reaction products with an excess (more than y mole) of hexadiene, except in the case of (P5) where decadiene was used. The organosilicon compounds thus obtained had the average general formula $$Me_3SiO(Me_2SiO)_x(MeR'SiO)_y(MeR''SiO)_zSiMe_3$$

wherein R' has the formula $CH_2=CH-(CH_2)_a-$, and R'' has the formula

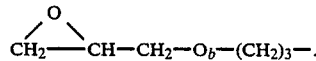

The characterisation of the promoters (P2) to (P5) is given in Table I.

TABLE I

| number | Adhesion Promoters | | | | |
|---|---|---|---|---|---|
|  | x | y | z | a | b |
| (P2) | 6.8 | 5.7 | 1.0 | 4 | 1 |
| (P3) | 6.8 | 3.4 | 3.3 | 4 | 1 |
| (P4) | 5.0 | 2.3 | 2.9 | 4 | 0 |
| (P5) | 5.0 | 2.2 | 3.1 | 8 | 1 |

To Lot A of the base composition nothing was added and this was used as a standard composition. To Lot B was added 1% by weight based on the weight of the composition of adhesion promotor (P1). To Lot C was added 1% by weight of adhesion promoter (P3). Each of Lots A, B, and C were tested in the following way I. Adhesion force was measured by the tensile peel test, in which a 1mm layer of the Lot was placed between the parallel parts (20×20 mm) of 2 adjacent L-shaped aluminium plates which, after curing one hour at 150° C. were pulled apart at right angles to the layer.

II. Cure inhibition was measured by judging the cure level achieved after 24 hours at room temperature.

III. Cure inhibition was also measured by measuring the time (in seconds) required to start the cure at 55° C. The following results were obtained

|  | Test I | Test II | Test III |
|---|---|---|---|
| Lot A | 5.95 N/mm | no cure | 745 |
| Lot B | 35.24 N/mm | no cure | 2450 |
| Lot C | 36.38 N/mm | cured | 935 |

The results of these tests show that the adhesion of a composition according to the present invention (Lot C) to aluminium was improved over the standard composition (Lot A), and at least as good as the adhesion achieved using the known adhesion promoter (Lot B). Lot (C) commenced curing within three hours and was cured within 24 hours, i.e. the composition according to the invention showed an insignificant cure inhibition whereas there was substantial cure inhibition shown when using a prior art adhesion promoter (Lot B).

To Lots D, E, F and G were added organosilicon compounds (P2), (P3), (P4) and (P5) respectively, at such levels that the alkenyl content of these compounds was 0.8 mM/110g of the composition in each of the Lots. All Lots showed cure at room temperature within 48 hours, and there was very little difference in the time required to start the cure at 55° C. (as described in Test III above).

Adhesion promotion was measured according to Test I as set out above, on Lots H, J, K, L and M which were prepared from a second base composition, prepared according to the formulation of the first base composition described above. To Lot H nothing was added, to Lots J, K, L and M were added amounts of organosilicon compounds (P2), P3), (P4) and (P5) respectively, such that the same level of epoxy groups was obtained in each Lot. The results of Test I were respectively 0.9, 3.5, 14.8, 13.3 and 13.0 N/mm for Lots H, J, K, L and M. These results show the importance of the proportion of epoxy and alkenyl groups per molecule. It can be seen organosilicon compounds having only one epoxy group per molecule in the absence of any other hydrolysable group, give less satisfactory results (Lot J). The most effective adhesion results were obtained by use of compositions containing an adhesion promoter in which z is similar to or larger than y.

That which is claimed is:

1. In an organopolysiloxane composition comprising
   (A) a polyorganosiloxane having an average of at least two units per molecule of the general formula $Q_aQ'SiO_{(3-a)/2}$ with any remaining units having the general formula $Q_bSiO_{(4-b)/2}$ where Q contains no more than 8 carbon atoms and is selected from the group consisting of monovalent hydrocarbon and substituted monovalent hydrocarbon radicals, Q' represents an organic group having olefinic unsaturation, a has a value of 1 or 2 and b has a value of 0, 1, 2 or 3, and at least 80 percent of the Q groups are methyl;
   (B) an organohydrogensiloxane having an average of at least two silicon-bonded hydrogen atoms per molecule, any remaining substituents on silicon being monovalent hydrocarbon radicals having no more than 8 carbon atoms; and
   (C) a catalyst selected from group VIII metals, compounds and complexes of said metals in an amount sufficient to catalyze a reaction between (A) and (B);

the improvement consisting essentially of the presence in said composition of an adhesion promoting organosilicon compound corresponding to the general formula $$(RO)_cR_{3-c}SiO(R_2SiO)_x(R'RSiO)_y(R''RSiO)_zSiR_{3-c}(OR)_c$$

where R is selected from the group consisting of monovalent hydrocarbon and substituted hydrocarbon radicals containing a maximum of 8 carbon atoms, alkoxyalkyl and substituted alkoxyalkyl; R' represents an olefinically unsaturated hydrocarbon radical containing at least 6 carbon atoms; R'' represents a monovalent epoxy-substituted radical selected from the group consisting of hydrocarbon, hydrocarbonoxy, halogenated hydrocarbon, halogenated hydrocarbonoxy, hydroxyl-substituted hydrocarbon and hydroxyl-substituted hydrocarbonoxy; the value of c is 0, 1, 2, or 3, the values of x, y, and z are at least 1, with the proviso that z is at least 2 when c is 0.

2. An organopolysiloxane composition according to claim 1, wherein R is selected from the group consisting of alkyl, alkoxyalkyl and aryl groups, and wherein R'' is selected from the group consisting of radicals with the general formula

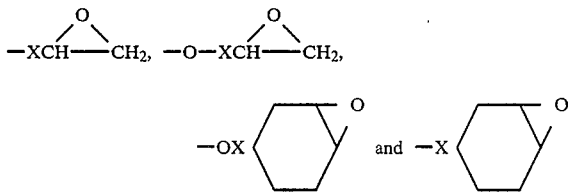

where X is selected from the group consisting of divalent hydrocarbon groups, divalent halogenated hydrocarbon groups, divalent hydrocarbon groups containing ether oxygen and divalent hydrocarbon groups containing a hydroxyl group.

3. An organopolysiloxane composition, according to claim 1 wherein R'' is selected from the group consisting of radicals with the formula

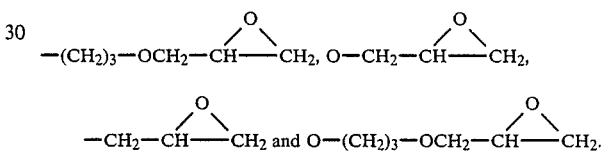

4. An organopolysiloxane composition according to claim 1 wherein c has a value of 3 and z has a value which is at least equal to y.

5. An organopolysiloxane composition according to claim 4, wherein z is larger than y, and the sum of x, y and z is less than 20.

6. An organopolysiloxane composition according to claim 1 wherein the unsaturated groups of polyorganosiloxane (A) are vinyl groups, and at least 80% of the remaining substituents are methyl groups.

7. An organopolysiloxane composition according to claim 6, wherein polyorganosiloxane (A) is a polydimethylsiloxane polymer having vinyl dimethyl siloxy endblocked units.

8. An organopolysiloxane composition according to claim 1 wherein organohydrogen siloxane (B) has not less than 5 siliconbonded hydrogen atoms per molecule, and has a viscosity of from about 15 to about 500 mm²/s at 25° C.

9. An organopolysiloxane composition according to claim 1 wherein the proportion of polyorganosiloxane (A) and organohydrogen siloxane (B) is such that at least 0.5 and up to 3 silicon-bonded hydrogen groups of (B) are provided per unsaturated group of (A).

* * * * *